(12) United States Patent
Huang

(10) Patent No.: US 7,729,426 B2
(45) Date of Patent: Jun. 1, 2010

(54) VIDEO DEBLOCKING FILTER

(75) Inventor: Cheng Huang, Irvine, CA (US)

(73) Assignee: DIVX, Inc., San Diego, CA (US)

( * ) Notice: Subject to any disclaimer, the term of this patent is extended or adjusted under 35 U.S.C. 154(b) by 1282 days.

(21) Appl. No.: 11/230,794

(22) Filed: Sep. 20, 2005

(65) Prior Publication Data

US 2006/0098744 A1 May 11, 2006

Related U.S. Application Data

(60) Provisional application No. 60/611,513, filed on Sep. 20, 2004.

(51) Int. Cl.
*H04N 7/12* (2006.01)
*G06K 9/40* (2006.01)

(52) U.S. Cl. .................. 375/240.29; 382/264

(58) Field of Classification Search ............ 375/240.29; 382/233, 236, 264
See application file for complete search history.

(56) References Cited

U.S. PATENT DOCUMENTS

| 6,314,209 | B1 | 11/2001 | Kweon et al. | |
|---|---|---|---|---|
| 6,427,031 | B1 * | 7/2002 | Price | 382/264 |
| 6,434,197 | B1 | 8/2002 | Wang et al. | |
| 6,553,148 | B2 | 4/2003 | Zeng et al. | |
| 6,792,149 | B1 | 9/2004 | Florencio | |
| 7,227,901 | B2 * | 6/2007 | Joch et al. | 375/240.29 |
| 2006/0110056 | A1 * | 5/2006 | Gambhire | 382/233 |
| 2006/0285757 | A1 * | 12/2006 | Abe et al. | 382/236 |

OTHER PUBLICATIONS

International Search Report for International Application No. PCT/US2005/033782, filed Sep. 20, 2005, Report completed Feb. 16, 2008, Mailed Feb. 26, 2008, 3 pages.
Written Opinion for International Application No. PCT/US2005/033782; filed Sep. 20, 2005, Opinion completed Feb. 16, 2008; mailed Feb. 26, 2008, 3 pages.
Author unknown, "Information Technology—Coding of Audio-Visual Objects—Part 2: Visual", International Standard, ISO/IEC 14496-2, Third edition, Jun. 1, 2004, pp. 1-706.

* cited by examiner

*Primary Examiner*—Gims S Philippe
(74) *Attorney, Agent, or Firm*—Kauth, Pomeroy, Peck & Bailey LLP

(57) ABSTRACT

Deblocking filters are disclosed, where the nature of the filter is determined based upon the level of detail of a reconstructed video frame in the region in which the block boundary is located. One embodiment of the method of the invention includes identifying a boundary between two blocks of the reconstructed video frame, determining the level of detail of the reconstructed video frame in a region in which the block boundary is located, wherein the region includes pixels from multiple rows and multiple columns of the reconstructed video frame and includes at least one pixel that is not immediately adjacent the block boundary and selecting a filter to apply to predetermined pixels on either side of the block boundary based upon the determined level of detail.

8 Claims, 4 Drawing Sheets

VIDEO DEBLOCKING FILTER

CROSS-REFERENCE TO RELATED APPLICATION(S)

This application claims the benefit of U.S. Provisional Patent Application No. 60/611,513, filed Sep. 20, 2004, the contents of which are expressly incorporated herein by reference in its entirety.

BACKGROUND

The present invention relates to video compression and in particular to methods of deblocking compressed video.

Digital video sequences are composed of frames of pixels, where the characteristics of the pixels are represented using digital information. The amount of data that is required to represent a video sequence can be reduced using compression. Several compression schemes seek to utilize characteristics that commonly occur within video sequences to achieve significant reductions in the amount of digital data required to encode a video sequence.

Encoding schemes, such as the scheme described in the MPEG-4 standard, can include video compression algorithms that divide frames into blocks of pixels and use the characteristics of the pixels within the blocks to encode the blocks of the video frame. Treating adjacent blocks separately in a lossy compression scheme can result in artifacts at block boundaries when an encoded video frame is reconstructed. A technique that can be used to remove artifacts and improve the quality of a reconstructed image involves applying a deblocking filter to pixels adjacent block boundaries.

The MPEG-4 standard developed by the Motion Picture Experts Group (i.e. ISO/IEC 14496) contains an example of a deblocking filter that can be applied when reconstructing video encoded using an MPEG-4 compliant encoder. The disclosure of the MPEG-4 standard is incorporated herein by reference in its entirety. The filtering is typically performed by a decoder and the filter is applied along the edges of the 8×8 blocks of pixels that were used in the encoding of the video frame. In many instances, the deblocking filter is applied to both luminance and chrominance data.

The deblocking filter specified in the MPEG-4 standard can operate in one of two modes. The modes are commonly referred to as the "DC offset mode" and "the default mode". The pixel conditions around each block boundary determine which mode to use. The "DC offset mode" is typically selected to filter block boundaries that are located within very smooth regions of a video frame (i.e. a region without much detail). The default mode is typically selected for all other cases. The term "smooth" describes a region of a video frame where the chrominance and luminance either do not vary or vary gradually across adjacent pixels. The term "detail" is typically used to describe visual elements of a video frame that vary significantly across adjacent pixels. The appearance of a reconstructed image usually can be improved by applying a filter that smoothes variation across block boundaries that lie in smooth regions of the image. However, smoothing a block boundary that lies in a region possessing a high level of detail can actually detract from the appearance of the reconstructed frame.

The decoding process specified in the MPEG-4 standard involves applying the MPEG-4 deblocking filter to each row of pixels at vertical block boundaries and each column of pixels at horizontal block boundaries. The application of the deblocking filter in relation to each row or column of pixels involves a decision concerning which filter mode is most appropriate. In order to determine the filtering mode to use, the decoder inspects five pixels of the row or column on either side of the block boundary. The following filter mode decision algorithm is then applied using the chrominance or luminance values of ten pixels $v_0$-$v_9$:

$$eq\_cnt = \phi(v_0-v_1)+\phi(v_1-v_2)+\phi(v_2-v_3)+\phi(v_3-v_4)+\phi(v_4-v_5)+\phi(v_5-v_6)+\phi(v_6-v_7)+\phi(v_7-v_8)+\phi(v_8-v_9),$$

where $\phi(\gamma)=1$ if $|\gamma| \leq THR1$ and 0 otherwise.

If (eq_cnt ≤ THR2)
DC offset mode is applied, else
Default mode is applied.

The threshold values THR1 and THR2 can be determined based upon the desired quality of the visual image. Suitable values for the thresholds are THR1=2 and THR2=6.

The "DC offset mode" of the deblocking filter is specified in the MPEG-4 standard and is intended to reduce blocking artifacts due to dc offset in very smooth regions of an image. The filter that is applied to the chrominance or luminance values of the four pixels on either side of a block boundary (i.e. $v_1$-$v_8$) in "DC offset mode" as follows $$\max = MAX(v_1, v_2, v_3, v_4, v_5, v_6, v_7, v_8),$$
$$\min = MIN(v_1, v_2, v_3, v_4, v_5, v_6, v_7, v_8),$$
if ( |max−min| < 2·QP ) {

$$v'_n = \sum_{k=-4}^{4} b_k \cdot p_{n+k}, \; 1 \leq n \leq 8$$

$$p_m = \begin{cases} (|v_1 - v_0| < QP)? \; v_0:v_1, & \text{if } m < 1 \\ v_m, & \text{if } 1 \leq m \leq 8 \\ (|v_8 - v_9| < QP)? \; v_9:v_8, & \text{if } m > 8 \end{cases}$$

$$\{b_k : -4 \leq k \leq 4\} = \{1,1,2,2,4,2,2,1,1\}//16$$

}
else
No change will be done.

where
QP is the average of the quantizers used in the encoding of the two blocks The "default mode" of the deblocking filter is also specified in the MPEG-4 standard and involves replacing the two pixels adjacent the block boundary (i.e. $v_4$ and $v_5$) as follows:

$$v_4' = v_4 - d,$$

$$v_5' = v_5 + d$$

and $$d = CLIP(5 \cdot (a_{3,0}' - a_{3,0})//8, 0, (v_4-v_5)/2) \cdot \delta(|a_{3,0}| < QP)$$

where $a_{3,0}' = SIGN(a_{3,0}) \cdot MIN(|a_{3,0}|, |a_{3,1}|, |a_{3,2}|)$.

Frequency components $a_{3,0}$, $a_{3,1}$, and $a_{3,2}$ can be evaluated from the simple inner product of the approximated DCT kernel [2−5 5−2] with the pixel vectors as follows:

$$a_{3,0} = ([2-5 \; 5-2] \circ [v_3 \; v_4 \; v_5 \; v_6]^T)//8,$$

$$a_{3,1} = ([2-5 \; 5-2] \circ [v_1 \; v_2 \; v_3 \; v_4]^T)//8,$$

$$a_{3,2} = ([2-5 \; 5-2] \circ [v_5 \; v_6 \; v_7 \; v_8]^T)//8.$$

The algorithm used in the "default mode" of the deblocking filter described in the MPEG-4 standard can involve complex calculations including 4-tap filtering and clipping.

SUMMARY OF THE INVENTION

Embodiments of the present invention include deblocking filters and methods of applying deblocking filters. In one embodiment of the invention, the characteristics of the deblocking filter are determined based upon the relative level of smoothness or detail in the region of a reconstructed video frame in which a block boundary is located. In many embodiments, the level of detail of a region is ascertained by inspecting a set of pixels including pixels from multiple rows and columns and at least one pixel that is not adjacent the block boundary. In several embodiments, the set of pixels is a block of pixels divided by the block boundary. In numerous embodiments, the characteristics of the filter can be further determined by the level of detail of the image in the region of the pixels being filtered.

One embodiment of the method of the invention includes identifying a boundary between two blocks of the reconstructed video frame, determining the level of detail of the reconstructed video frame in a region in which the block boundary is located, where the region includes pixels from multiple rows and multiple columns of the reconstructed video frame and includes at least one pixel that is not immediately adjacent the block boundary, and selecting a filter to apply to predetermined pixels on either side of the block boundary based upon the determined level of detail.

In a further embodiment, the determination of the level of detail of the reconstructed video frame in a region in which the block boundary is located further includes taking the sum of the absolute difference of at least some of the pixels within a set of pixels surrounding the block boundary.

In another embodiment the block boundary is a horizontal block boundary and the set of pixels is a block of pixels that is divided by the horizontal block boundary. In addition, the sum of the absolute difference is taken for each vertically adjacent pair of pixels in each column of the block of pixels, except the pair of pixels that are separated by the block boundary.

In a still further embodiment, the set of pixels is an 8×8 block that is evenly divided by the horizontal block boundary.

In still another embodiment, the determination of the level of detail involves calculating the following sum:

$$\sum_i \sum_j |v_{i+1,j} - v_{i,j}|, \text{ where } i = 1 \text{ to } 7 \text{ and } i \neq 4, j = 1 \text{ to } 8.$$

where:

$v_{i,j}$ is the chrominance of a pixel in row i and column j of the 8×8 block of pixels.

In a yet further embodiment, the determination of the level of detail involves calculating the following sum:

$$\sum_i \sum_j |v_{i+1,j} - v_{i,j}|, \text{ where } i = 1 \text{ to } 7 \text{ and } i \neq 4, j = 1 \text{ to } 8.$$

where:

$v_{i,j}$ is the luminance of a pixel in row i and column j of the 8×8 block of pixels.

In yet another embodiment, the set of pixels is a 4×8 block that is evenly divided by the horizontal block boundary.

In a further embodiment again, the determination of the level of detail involves calculating the following sum:

$$\sum_i \sum_j |v_{i+1,j} - v_{i,j}|, \text{ where } i = 1 \text{ to } 7 \text{ and } i \neq 4, j = 1 \text{ to } 4.$$

where:

$v_{i,j}$ is the chrominance of a pixel in row i and column j of the 4×8 block of pixels.

In another embodiment again, the determination of the level of detail involves calculating the following sum:

$$\sum_i \sum_j |v_{i+1,j} - v_{i,j}|, \text{ where } i = 1 \text{ to } 7 \text{ and } i \neq 4, j = 1 \text{ to } 4.$$

where:

$v_{i,j}$ is the luminance of a pixel in row i and column j of the 4×8 block of pixels.

In a still further embodiment again, the block boundary is a vertical block boundary, the set of pixels is a block of pixels that is divided by the vertical block boundary and the sum of the absolute difference is taken for each adjacent pair of pixels in each row of the block of pixels, except the pair of pixels that are separated by the block boundary.

In still another embodiment again, the set of pixels is an 8×8 block that is evenly divided by the vertical block boundary.

In a yet further embodiment again, the determination of the level of detail involves calculating the following sum:

$$\sum_i \sum_j |v_{i,j+1} - v_{i,j}|, \text{ where } i = 1 \text{ to } 8, j = 1 \text{ to } 7 \text{ and } j \neq 4.$$

where:

$v_{i,j}$ is the chrominance of a pixel in row i and column j of the 8×8 block of pixels.

In yet another embodiment again the determination of the level of detail involves calculating the following sum:

$$\sum_i \sum_j |v_{i,j+1} - v_{i,j}|, \text{ where } i = 1 \text{ to } 8, j = 1 \text{ to } 7 \text{ and } j \neq 4.$$

where:

$v_{i,j}$ is the luminance of a pixel in row i and column j of the 8×8 block of pixels.

In a yet further additional embodiment, the set of pixels is an 8×4 block that is evenly divided by the vertical block boundary.

In yet another additional embodiment, the determination of the level of detail involves calculating the following sum:

$$\sum_i \sum_j |v_{i,j+1} - v_{i,j}|, \text{ where } i = 1 \text{ to } 4, j = 1 \text{ to } 7 \text{ and } j \neq 4.$$

where:

$v_{i,j}$ is the chrominance of a pixel in row i and column j of the 8×4 block of pixels.

In a still further additional embodiment the determination of the level of detail involves calculating the following sum:

$$\sum_i \sum_j |v_{i,j+1} - v_{i,j}|, \text{ where } i = 1 \text{ to } 4, j = 1 \text{ to } 7 \text{ and } j \neq 4.$$

where:

$v_{i,j}$ is the luminance of a pixel in row i and column j of the 8×4 block of pixels.

In still another additional embodiment, selecting a filter to apply to predetermined pixels on either side of the block boundary based upon the determination of the level of detail includes comparing the determined level of detail to a threshold.

In a yet further additional embodiment again, the threshold varies depending upon the quantizer used in the encoding of the blocks at the block boundary.

In yet another additional embodiment again, selecting a filter to apply to predetermined pixels on either side of the block boundary based upon the determination of the level of detail further includes when the level of detail exceeds the threshold, selecting a filter to apply to predetermined pixels. In addition, selection of a filter includes determining the detail of the image in the region of the pixels being filtered.

In a still further additional embodiment again, the block boundary is a horizontal block boundary and determining the detail of the image in the region of the pixels being filtered includes calculating the following expression with respect to a column of pixels divided by the horizontal block boundary:

$$(|v_{-2}-v_{-1}|*3+|v_{-1}-v_1|*2+|v_1-v_2|*3)//8$$

where:

$v_i$ is the chrominance of the pixel i pixels from the horizontal block boundary.

In still another additional embodiment again, the block boundary is a horizontal block boundary and determining the detail of the image in the region of the pixels being filtered includes calculating the following expression with respect to a column of pixels divided by the horizontal block boundary:

$$(|v_{-2}-v_{-1}|*3+|v_{-1}-v_1|*2+|v_1-v_2|*3)//8$$

where:

$v_i$ is the luminance of the pixel i pixels from the horizontal block boundary.

In still another further embodiment, the block boundary is a vertical block boundary and determining the detail of the image in the region of the pixels being filtered includes calculating the following expression with respect to a row of pixels divided by the vertical block boundary:

$$(|v_{-2}-v_{-1}|*3+|v_{-1}-v_1|*2+|v_1-v_2|*3)//8$$

where:

$v_i$ is the chrominance of the pixel i pixels from the vertical block boundary.

In still another further embodiment, the block boundary is a vertical block boundary and determining of the detail of the image in the region of the pixels being filtered includes calculating the following expression with respect to a row of pixels divided by the vertical block boundary:

$$(|v_{-2}-v_{-1}|*3+|v_{-1}-v_1|*2+|v_1-v_2|*3)//8$$

where:

$v_i$ is the luminance of the pixel i pixels from the vertical block boundary.

In still another further embodiment again, selecting a filter to apply to each pixel on either side of the block boundary further includes comparing the determined level of detail in the region of the pixels being filtered to a first threshold and applying a first filter when the level of detail is less than the threshold.

In yet another further embodiment again, the first threshold varies with respect to the value of the quantizer used in the encoding of each of the blocks at the block boundary.

In still another further additional embodiment, selecting a filter to apply to each pixel on either side of the block boundary further includes comparing the determined level of detail in the region of the pixels being filtered to a second threshold and applying a second filter when the level of detail exceeds the first threshold and is less than the second threshold.

In yet another further additional embodiment, selecting a filter to apply to each pixel on either side of the block boundary further includes applying the following filter when the level of detail is less than the first threshold:

$$v_{-1}' = ([4\ 9\ 3] \cdot [v_{-2}\ v_{-1}\ v_1]^T)//16$$

$$v_1' = ([4\ 9\ 3] \cdot [v_2\ v_1\ v_{-1}]^T)//16$$

applying the following filter when the level of detail exceeds the first threshold and is less than the second threshold:

$$v_{-1}' = ([3\ 11\ 2] \cdot [v_{-2}\ v_{-1}\ v_1]^T)//16$$

$$v_1' = ([3\ 11\ 2] \cdot [v_2\ v_1\ v_{-1}]^T)//16$$

else applying the following filter:

$$v_{-1}' = v_{-1}$$

$$v_1' = v_1$$

where $v_i$ is the chrominance of a pixel displaced i pixels from the block boundary.

In still another further additional embodiment again, selecting a filter to apply to each pixel on either side of the block boundary further includes applying the following filter when the level of detail is less than the first threshold:

$$v_{-1}' = ([4\ 9\ 3] \cdot [v_{-2}\ v_{-1}\ v_1]^T)//16$$

$$v_1' = ([4\ 9\ 3] \cdot [v_2\ v_1\ v_{-1}]^T)//16$$

applying the following filter when the level of detail exceeds the first threshold and is less than the second threshold:

$$v_{-1}' = ([3\ 11\ 2] \cdot [v_{-2}\ v_{-1}\ v_1]^T)//16$$

$$v_1' = ([3\ 11\ 2] \cdot [v_2\ v_1\ v_{-1}]^T)//16$$

else applying the following filter $$v_{-1}' = v_{-1}$$

$$v_1' = v_1$$

where $v_i$ is the luminance of a pixel displaced i pixels from the block boundary.

An embodiment of the apparatus of the invention includes a 3-tap filter. In addition, the inputs to the 3-tap filter include the chrominance of three pixels, the 3-tap filter is configured to increase the weighting to the second input with increased variation between a set of pixels including at least the three pixels provided to the inputs and the 3-tap filter is configured to decease the weighting to the first and third inputs with increased variation between the set of pixels including at least the three pixels provided to the inputs.

In a further embodiment, the set of pixels including at least the three pixels provided to the inputs further includes a fourth pixel, where the 3-tap filter is configured to determine the variation between the pixels by taking a weighted absolute sum of the difference between the chrominance of the pixels.

In another embodiment, the 3-tap filter is configured to calculate:

$$(|v_1-v_2|*3+|v_2-v_3|*2+|v_3-v_4|*3)//8$$

wherein $v_i$ is the chrominance of the ith pixel.

In a further embodiment again, the weightings of the 3-tap filter are asymmetric with respect to the second input.

Another embodiment again includes a 3-tap filter. In addition, the inputs to the 3-tap filter include the luminance of three pixels, the 3-tap filter is configured to increase the weighting to the second input with increased variation between a set of pixels including at least the three pixels provided to the inputs and the 3-tap filter is configured to decease the weighting to the first and third inputs with increased variation between the set of pixels including at least the three pixels provided to the inputs.

In a still further embodiment, the set of pixels including at least the three pixels provided to the inputs further involves a fourth pixel and the 3-tap filter is configured to determine the variation between the pixels by taking a weighted absolute sum of the difference between the luminance of the pixels.

In still another embodiment, the 3-tap filter is configured to calculate:

$$(|v_1-v_2|*3+|v_2-v_3|*2+|v_3-v_4|*3)//8$$

wherein $v_i$ is the luminance of the ith pixel.

In a yet further embodiment, the weightings of the 3-tap filter are asymmetric with respect to the second input.

DETAILED DESCRIPTION OF THE INVENTION

Turning now to the drawings, a deblocking scheme is illustrated that applies varying levels of smoothing to edge boundaries based upon the level of detail of a video frame in a region surrounding the block boundary. In many embodiments, the decision concerning the specific characteristics of the filter applied to the pixels adjacent a block boundary is made by analyzing the characteristics of a set of pixels, including pixels from multiple rows and multiple columns, lying on either side of the boundary. Once the level of detail of the set of pixels has been determined, a filter appropriate to the level of detail can be applied to the pixels adjacent the boundary.

Figures 1, 3:
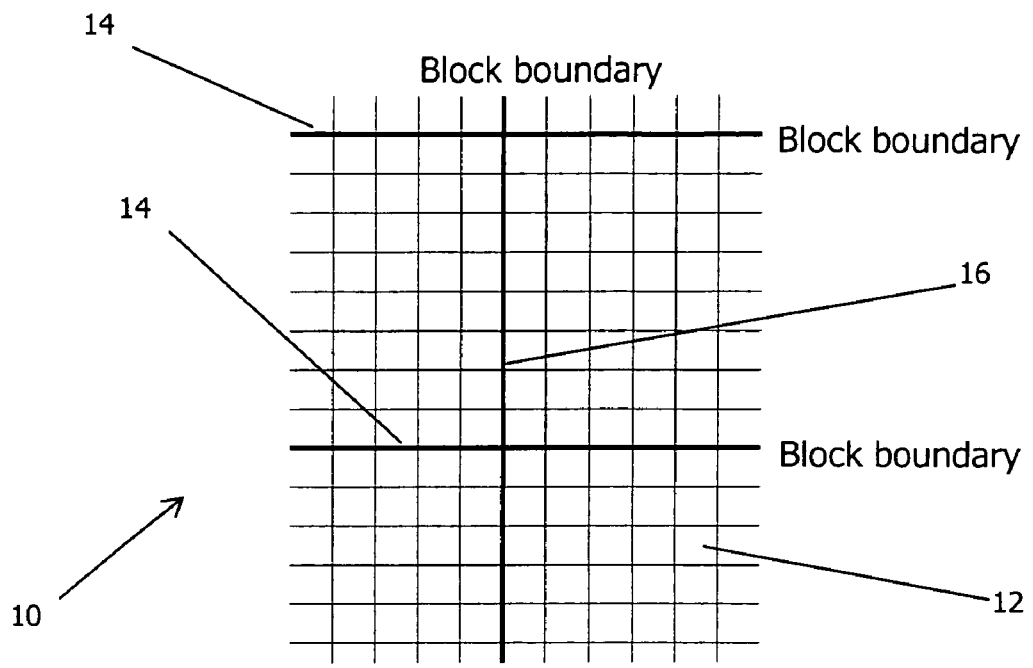
FIG. 1 is a schematic view a video frame reconstructed from video data obtained using an encoding scheme that utilizes the characteristics of 8×8 pixel blocks.
FIG. 3 is a schematic view of a block of pixels used to determine an appropriate filter to apply to a horizontal block boundary in accordance with an embodiment of the invention.

A portion of a reconstructed video frame is represented in FIG. 1. The video frame 10 is made up of a number of pixels 12. In the illustrated embodiment, the video frame was reconstructed from data encoded using the characteristics of blocks of pixels. The horizontal boundaries 14 and vertical boundaries 16 between the reconstructed blocks of pixels are shown in FIG. 1. In the illustrated embodiment, the blocks are of 8×8 pixels. In other embodiments, the block can include a greater or lesser number of pixels with a different number of pixels in the horizontal and/or vertical dimensions. A deblocking filter in accordance with an embodiment of the present invention can be applied to the pixels along the horizontal and vertical block boundaries to improve the visual appearance of the video frame.

Figure 2:
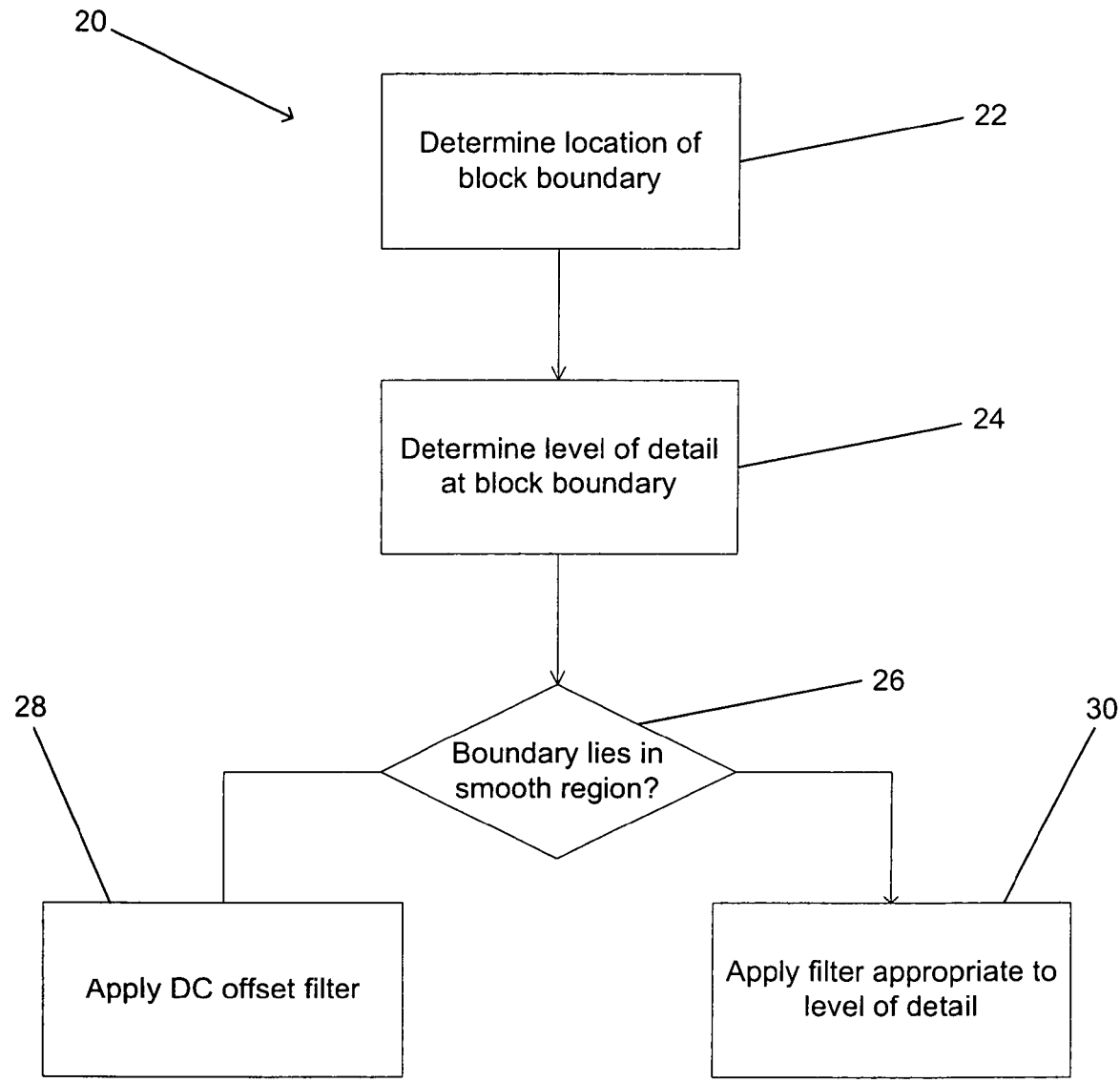
FIG. 2 is a flow chart showing a process for filtering block boundaries of a reconstructed video frame in accordance with an embodiment of the invention.

A process for applying a deblocking filter in accordance with an embodiment of the present invention is shown in FIG. 2. The process 20 involves identifying (22) the location of horizontal and vertical block boundaries. The level of detail of the region of the video frame in which the block boundary is located is then determined (24). If the process determines (26) that a boundary lies in a smooth region of the reconstructed image, then a smoothing filter can be applied (28) to the pixels adjacent the boundary. When the boundary lies within a region possessing a threshold level of detail, a filter appropriate to the level of detail can be applied (30) to the pixels along the horizontal or vertical boundary. As will be discussed further below a first deblocking filter can be applied to pixel chrominance and/or a second deblocking filter can be applied to pixel luminance. In many embodiments, the same techniques can be used to determine the characteristics of the first and second filters that are applied to pixel chrominance and/or luminance.

Many embodiments of deblocking filters in accordance with the present invention use sets of pixels that include pixels from multiple rows and multiple columns including pixels that are not adjacent the boundary to determine whether a boundary lies within a region of the image that is smooth or a region that contains significant levels of detail. Pixels that can be used to determine whether a horizontal boundary lies within a smooth region of a reconstructed video frame in accordance with an embodiment of the invention are illustrated in FIG. 3. The set of pixels 40 includes pixels from multiple rows and multiple columns. In the illustrated embodiment, the set of pixels 40 is an 8×8 block that is divided in half by the horizontal boundary 14. In other embodiments, the dimensions of the set of pixels can vary.

In the illustrated embodiment, each pixel in the set of pixels used to determine the level of detail of the region of the image in which the boundary lies is indicated using the notation $v_{i,j}$ where i and j represent the position of the pixel with respect to the top left hand corner of the 8×8 set of pixels. When applying a deblocking filter to pixel chrominance $v_{i,j}$ can be the value of the pixels chrominance. When applying a deblocking filter to pixel luminance $v_{i,j}$ can be the value of the pixel luminance.

In several embodiments, the level of detail of a set of pixels can be determined by taking the sum of the absolute difference of adjacent pixels in the set of pixels. When determining the level of detail in the chrominance or luminance using a sum of the absolute difference in the chrominance or luminance of pixels, the absolute difference of pixels separated by a block barely is often excluded from the calculation. The absolute difference of pixels separated by a block boundary can be excluded, because the absolute difference of these pixels can often be more reflective of the differences in the values of the quantizer used to encode the adjacent blocks of the video frame than the level of detail of the image in that region. In the case of a horizontal block boundary 14, many embodiments take the sum of the absolute difference of each vertically adjacent pair of pixels in each column of the set of pixels except the pair of pixels that are separated by the block boundary. In the case of a vertical block boundary 16, many embodiments take the sum of the absolute difference of each horizontally adjacent pair of pixels in each row of the set of pixels except the pair of pixels that are separated by the block boundary.

In one embodiment, the relative smoothness of the region in which a horizontal block boundary is located can be determined in accordance with the following algorithm:

$$\text{sum\_SAD} = \sum_i \sum_j |v_{i+1,j} - v_{i,j}|,$$

where $i = 1$ to 7 and $i \neq 4$, $j = 1$ to 8.

if (sum_SAD≦THR(QP)*2
boundary lies within a relatively smooth region, else
boundary lies within a relatively detailed region.
where
THR(QP) is a threshold adaptive to QP
QP is the average value of the quantizer for the two 8×8 blocks on each side of the block boundary.

In one embodiment, the threshold values that are used for each QP are as listed in Table 1.

TABLE 1

THR(QP) as a function of QP

| QP | THR(QP) |
|---|---|
| 1 | 10 |
| 2 | 12 |
| 3 | 15 |
| 4 | 18 |
| 5 | 21 |
| 6 | 23 |
| 7 | 25 |
| 8 | 27 |
| 9 | 29 |
| 10 | 31 |
| 11 | 33 |
| 12 | 35 |
| 13 | 37 |
| 14 | 39 |
| 15 | 41 |
| 16 | 43 |
| 17 | 45 |
| 18 | 47 |
| 19 | 49 |
| 20 | 51 |
| 21 | 52 |
| 22 | 53 |
| 23 | 54 |
| 24 | 55 |
| 25 | 56 |
| 26 | 57 |
| 27 | 59 |
| 28 | 61 |
| 29 | 63 |
| 30 | 65 |
| 31 | 68 |

In other embodiments, other values for THR(QP) with respect to QP can be used based upon the relative image quality resulting from the application of various filters to the pixels along the boundary. In addition, the value of QP can be determined in other ways. In one embodiment, QP is determined as the average of the quantizer values for each block in the video frame. In a further embodiment, the value of QP is determined as the value of the quantizer used to encode one of the blocks adjacent the block boundary. In other embodiments, QP can be determined in a variety of ways that are indicate of values of the quantizer used in the encoding of the video frame.

In many embodiments, a determination that the boundary lies within a region of the image that is smooth (e.g. sum_SAD≦THR(QP)*2) results in the application of a filter possessing characteristics similar to the deblocking filter specified in the MPEG-4 standard, when operating in "DC offset mode". In other embodiments, other smoothing filters can be applied. In a number of embodiments, a determination that a boundary lies within a region of an image that is relatively detailed (e.g. sum_SAD>THR(QP)*2) can result in the application of a filter appropriate to the level of detail. Embodiments of filters in accordance with the present invention that are appropriate in instances where a block boundary lies in a region possessing a comparatively high level of detail are discussed below.

When a reconstructed image includes a boundary that lies within a detailed region of the image, the quality of the image can be improved by applying a level of filtering appropriate to the level of detail. In one embodiment, the amount of smoothing applied by a deblocking filter along a block boundary is inversely proportional to the level of detail of the image in the region being filtered.

In several embodiments, the filter applied is determined based upon the level of detail of the portion of the image represented by the pixels to which the filter is to be applied. In one embodiment, the filter is applied to pixels from a single row or column that are adjacent the block boundary. In a further embodiment, the filter is applied to the two pixels on either side of the block boundary and the level of detail of the portion of the image represented by these four pixels is obtained using the following expression:

$$\text{var} = (|v_{3,j} - v_{4,j}|*3 + |v_{4,j} - v_{5,j}|*2 + |v_{5,j} - v_{6,j}|*3)//8$$

Using a simple 3-tap low pass filter, a deblocking filter in accordance with an embodiment of the present invention can be created that tailors to the level of detail in accordance with the following algorithm:

if (var≦$THR\_1(QP)$)

$v_{4,j}' = ([4\ 9\ 3] \circ [v_{3,j}\ v_{4,j}\ v_{5,j}]^T)//16$ $v_{5,j}' = ([4\ 9\ 3] \circ [v_{6,j}\ v_{5,j}\ v_{4,j}]^T)//16$ else if (var≦$THR\_2(QP)$)

$v_{4,j}' = ([3\ 11\ 2] \cdot [v_{3,j}\ v_{4,j}\ v_{5,j}]^T)//16$ $v_{5,j}' = ([3\ 11\ 2] \cdot [v_{6,j}\ v_{5,j}\ v_{4,j}]^T)//16$ else $v_{4,j}' = v_{4,j}$ $v_{5,j}' = v_{5,j}$ where
THR_1(QP) and THR_2(QP) represent various thresholds in the level of detail and are adaptive with respect to QP
QP is the average value of the quantizer for the two 8×8 blocks on each side of the block boundary In one embodiment, the threshold values for each QP are the values shown in Table 2

TABLE 2 values of THR_1 and THR_2 with respect to QP

| QP | THR_1(QP) | THR_2(QP) |
|---|---|---|
| 1 | 1 | 2 |
| 2 | 1 | 3 |
| 3 | 2 | 5 |
| 4 | 2 | 6 |
| 5 | 3 | 8 |
| 6 | 4 | 9 |
| 7 | 5 | 10 |
| 8 | 5 | 11 |
| 9 | 6 | 12 |
| 10 | 6 | 13 |
| 11 | 7 | 14 |
| 12 | 7 | 15 |
| 13 | 8 | 16 |
| 14 | 8 | 17 |
| 15 | 9 | 18 |
| 16 | 9 | 19 |
| 17 | 10 | 20 |
| 18 | 10 | 21 |
| 19 | 11 | 22 |
| 20 | 11 | 23 |
| 21 | 12 | 24 |
| 22 | 12 | 25 |
| 23 | 13 | 26 |
| 24 | 13 | 27 |
| 25 | 14 | 28 |
| 26 | 14 | 30 |
| 27 | 15 | 32 |
| 28 | 15 | 34 |
| 29 | 16 | 36 |
| 30 | 16 | 38 |
| 31 | 17 | 40 |

In the embodiment described above, the deblocking filter applies the greatest amount of smoothing when the level of detail is less than the first threshold (i.e. var≦THR_1(QP)). A decreased amount of smoothing is applied when the level of detail is between the first and second thresholds (i.e. THR_1(QP)<var≦THR_2(QP)) and the deblocking filter does not apply any smoothing to the pixels when the level of detail exceeds the second threshold (i.e. var>THR_2(QP)).

In other embodiments, other values for THR_1(QP) and THR_2(QP) can be used that are determined based upon observation of the image quality subsequent to the application of the deblocking filter to the reconstructed image. As discussed above, other embodiments of deblocking filters in accordance with the present invention derive QP in other ways that are indicative of the values of the quantizers used to encode the blocks of the reconstructed video frame.

Although the above embodiment uses two thresholds to determine the level of smoothing to be applied by the deblocking filter to pixels adjacent a block boundary located in a detailed region of an image, many embodiments use the same level of smoothing for all pixels adjacent block boundaries located within relatively detailed regions of an image. Alternatively, embodiments of deblocking filters in accordance with the present invention can include a single threshold or more than two thresholds to determine the appropriate filter to apply.

In many embodiments, a 3-tap filter is used that increases the weighting provided to the $2^{nd}$ filter input as the level of detail of the portion of the image represented by the pixels being filtered increases. In addition, several embodiments decrease the weighting provided to the $1^{st}$ and $3^{rd}$ inputs of the 3-tap filter as the level of detail of the portion of the image represented by the pixels being filtered increases. Furthermore, numerous embodiments of 3-tap filters in accordance with the present invention are asymmetric with respect to pixel being filtered. In many instances, use of asymmetric weightings in accordance with embodiments of the present invention can reduce translation distortions that may result from filtering across a block boundary.

In many embodiments, a similar technique is used to smooth vertical block boundaries as is used to smooth horizontal block boundaries. In other embodiments, the technique used to determine the level of detail of the region of an image in which a vertical block boundary lies need not correspond to the technique used to determine the level of detail of the region of the image in which a horizontal block boundary lies.

Figure 4:
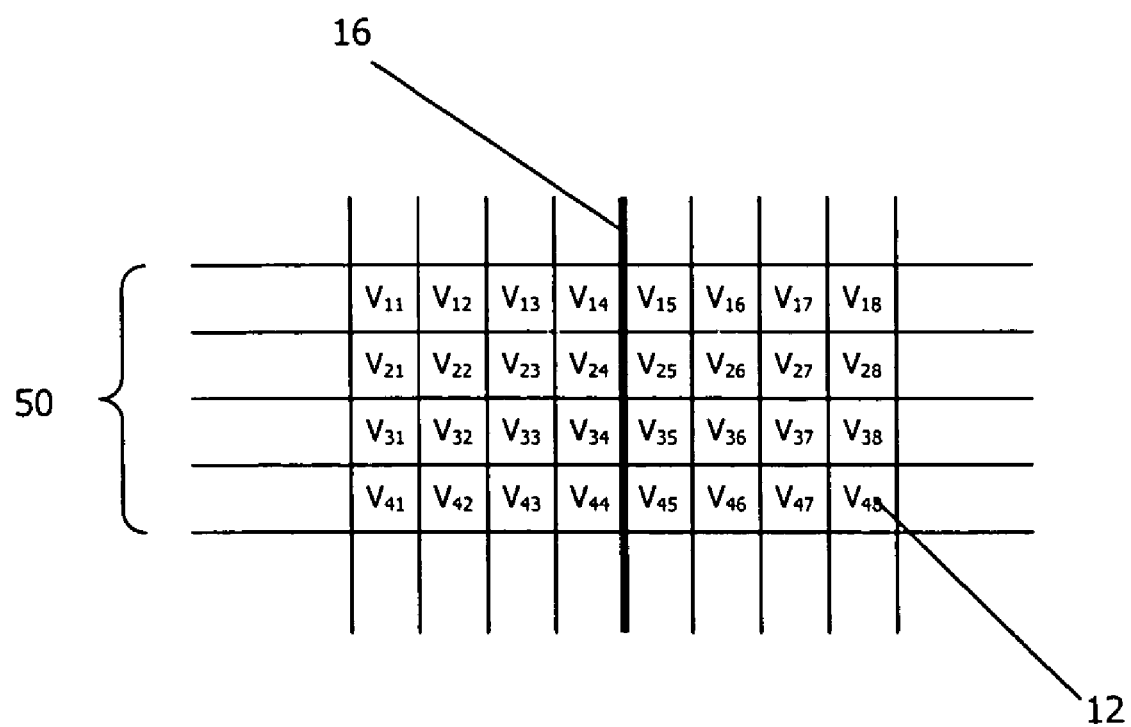
FIG. 4 is a schematic view of a block of pixels used to determine the filtering applied to a vertical block boundary in accordance with an embodiment of the invention.
Figure 5:
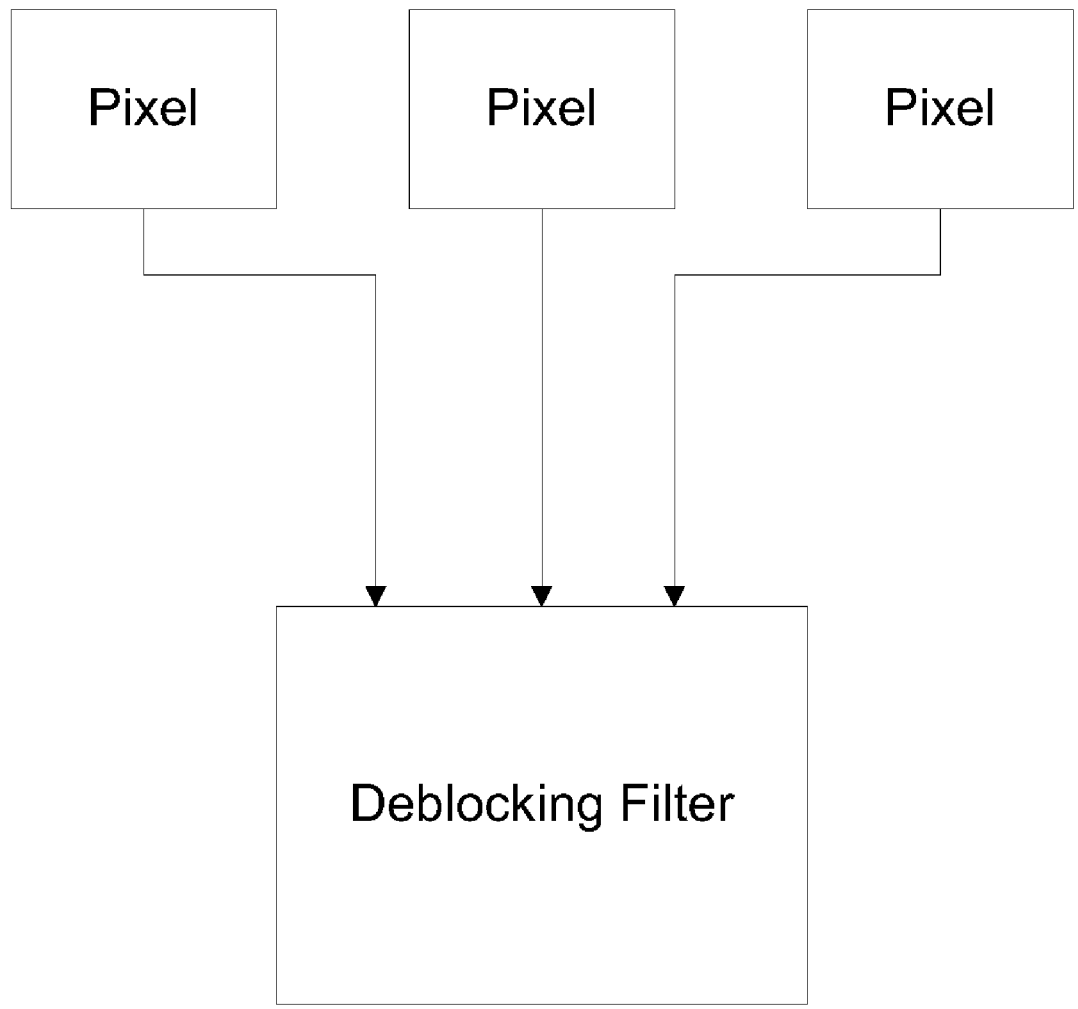
FIG. 5 is a block diagram of a deblocking filter in accordance with various embodiments of the present invention.

A set of pixels that can be used to determine whether a vertical block boundary lies within a relatively smooth region of an image or a relatively detailed region of an image is shown in FIG. 4. The set 50 forms an 8×4 block of pixels 12 that includes four pixels on either side of the vertical block boundary 16. As discussed above other sets of pixels possessing greater or smaller dimensions can also be used.

In one embodiment, a determination of whether the vertical block boundary 16 lies within a relatively smooth region or relatively detailed region involves analyzing the pixels within this 8×4 block as follows:

$$\text{sum\_SAD} = \sum_i \sum_j |v_{i,j} - v_{i,j+1}|,$$

where $i = 1$ to 4, $j = 1$ to 7 and $j \neq 4$ if (sum_SAD≦THR(QP))
block boundary lies in relatively smooth region, else
block boundary lies in relatively detailed region.
where
THR(QP) is a threshold adaptive to QP
QP is the average value of the quantizer for the two 8×8 blocks on each side of the block boundary.

In one embodiment, the threshold values that are used for each QP are as listed in Table 1 above. In other embodiments, other values can be used based upon the relative image quality resulting from the application of various filters to the pixels along the boundary.

Once a determination has been made as to whether the block boundary lies in a relatively smooth region or a relatively detailed region, deblocking filters similar to those described above with respect to the filtering of horizontal block boundaries can be used to filter the pixels along the vertical boundary in accordance with an embodiment of the invention. In other embodiments, other suitable deblocking filters can be applied. Furthermore, although the above description relates to vertical boundaries the same techniques can be applied in accordance with embodiments of the present invention to the use of 4×8 blocks for determining the level of detail of an image surrounding a horizontal boundary.

While the above description contains many specific embodiments of the invention, these should not be construed as limitations on the scope of the invention, but rather as an example of one embodiment thereof. For example, although determinations of relative smoothness or detail of a region of an image in which a boundary lies are discussed with respect to 8×8, 8×4 and 4×8 blocks of pixels, the techniques are equally applicable for sets of pixels where the number of rows and columns of pixels are increased and/or decreased.

Accordingly, the scope of the invention should be determined not by the embodiments illustrated, but by the appended claims and their equivalents.

What is claimed is:

1. A deblocking filter, comprising:
   a 3-tap filter;
   wherein the inputs to the 3-tap filter include the chrominance of three pixels;
   wherein the 3-tap filter is configured to increase the weighting to the second input with increased variation between a set of pixels including at least the three pixels provided to the inputs; and
   wherein the 3-tap filter is configured to decease the weighting to the first and third inputs with increased variation between the set of pixels including at least the three pixels provided to the inputs.

2. The deblocking filter of claim 1, wherein the set of pixels including at least the three pixels provided to the inputs further comprises:
   a fourth pixel;
   wherein the 3-tap filter is configured to determine the variation between the pixels by taking a weighted absolute sum of the difference between the chrominance of the pixels.

3. The deblocking filter of claim 2, the 3-tap filter is configured to calculate:

$$(|v_1-v_2|*3+|v_2-v_3|*2+|v_3-v_4|*3)//8$$

wherein
   $V_i$ is the chrominance of the ith pixel.

4. The deblocking filter of claim 1, wherein the weightings of the 3-tap filter are asymmetric with respect to the second input.

5. A deblocking filter, comprising:
   a 3-tap filter;
   wherein the inputs to the 3-tap filter include the luminance of three pixels;
   wherein the 3-tap filter is configured to increase the weighting to the second input with increased variation between a set of pixels including at least the three pixels provided to the inputs; and
   wherein the 3-tap filter is configured to decease the weighting to the first and third inputs with increased variation between the set of pixels including at least the three pixels provided to the inputs.

6. The deblocking filter of claim 5, wherein the set of pixels including at least the three pixels provided to the inputs further comprises:
   a fourth pixel;
   wherein the 3-tap filter is configured to determine the variation between the pixels by taking a weighted absolute sum of the difference between the luminance of the pixels.

7. The deblocking filter of claim 6, the 3-tap filter is configured to calculate:

$$(|v_1-V_2|*3+|v_2-v_3|*2+|v_3-v_4|*3)//8$$

wherein
   $v_i$ is the luminance of the ith pixel

8. The deblocking filter of claim 5, wherein the weightings of the 3-tap filter are asymmetric with respect to the second input.

* * * * *

UNITED STATES PATENT AND TRADEMARK OFFICE
CERTIFICATE OF CORRECTION

PATENT NO. : 7,729,426 B2  
APPLICATION NO. : 11/230794  
DATED : June 1, 2010  
INVENTOR(S) : Cheng Huang Page 1 of 1

It is certified that error appears in the above-identified patent and that said Letters Patent is hereby corrected as shown below:

In the Specifications

Column 6, line 62, delete "decease" and add --decrease--.
Column 7, line 17, delete "decease" and add --decrease--.

In the Claims

Column 13, Claim 1, line 13, delete "decease" and add --decrease--.
Column 13, Claim 3, line 30, delete "$V_i$" and add --$v_i$--.
Column 14, Claim 5, line 9, delete "decease" and add --decrease--.
Column 14, Claim 7, line 25, delete "$V_2$" and add --$v_2$--.

Signed and Sealed this
Twentieth Day of May, 2014

Michelle K. Lee
*Deputy Director of the United States Patent and Trademark Office*